J. F. O'CONNOR.
SHOCK ABSORBER.
APPLICATION FILED JUNE 6, 1919.
1,421,820.
Patented July 4, 1922.
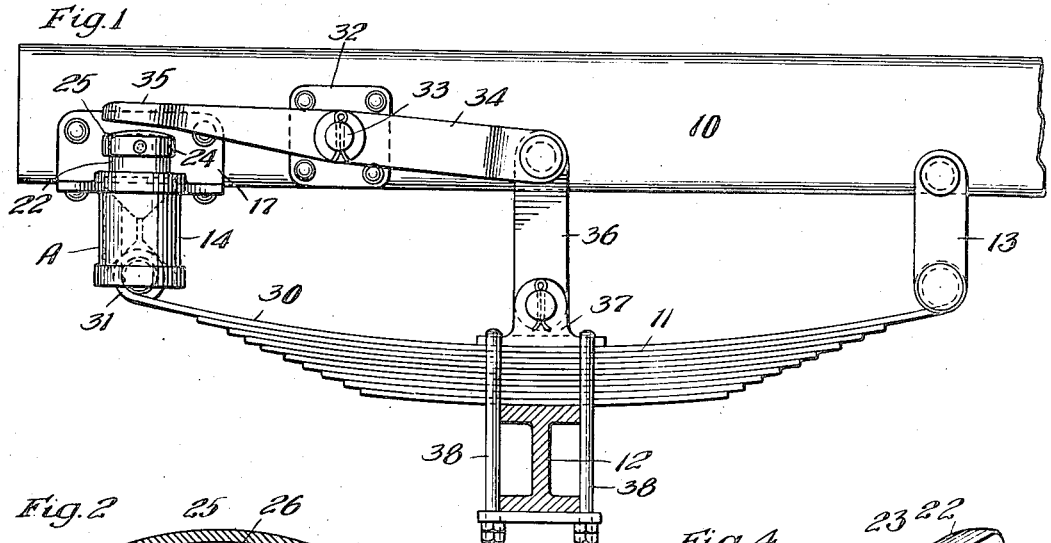
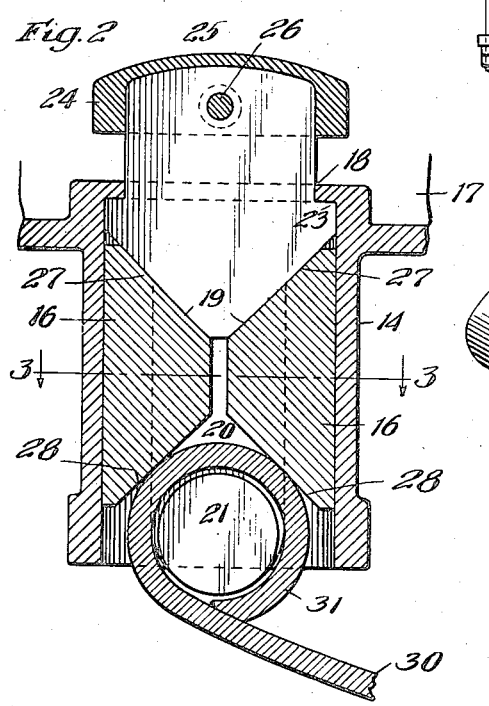
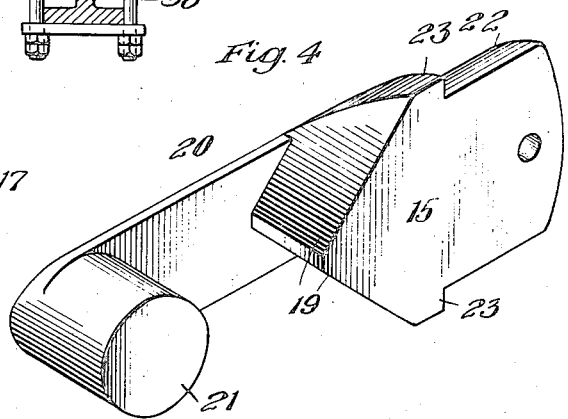
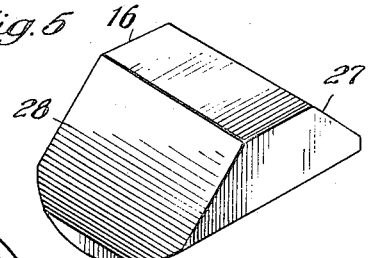
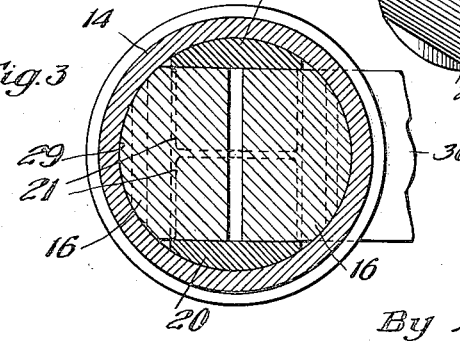
Witnesses
Wm. Geiger
Inventor
John F. O'Connor
By Geo. I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK ABSORBER.

1,421,820.  Specification of Letters Patent.  Patented July 4, 1922.

Application filed June 6, 1919. Serial No. 302,255.

*To all whom it may concern:*

Be it known that I, JOHN F. O'CONNOR, a citizen of the United States, residing at Chicago, in the county of Cook and State of Illinois, have invented a certain new and useful Improvement in Shock Absorbers, of which the following is a full, clear, concise, and exact description, reference being had to the accompanying drawings, forming a part of this specification.

This invention relates to improvements in shock absorbers.

The object of the invention is to provide an inexpensive and simple shock absorber adapted for use on automobiles and other like vehicles to absorb or cushion excessive shocks.

In the drawing forming a part of this specification, Figure 1 is a side elevational view of a portion of an automobile chassis showing my improvements in connection therewith, the axle being shown in section. Fig. 2 is a vertical detail sectional view of the shock absorbing device, the section being taken on a plane parallel to the chassis shown in Fig. 1. Fig. 3 is a horizontal sectional view taken substantially on the line 3—3 of Fig. 2. Fig. 4 is a detail perspective of one of the wedge members. And Fig. 5 is a detail perspective of one of the friction shoes.

In said drawing, 10 denotes a side member of an automobile chassis or truck, 11 a semi-elliptic spring secured at its center in the usual manner to the axle 12. At one end, the spring 11 is connected to the chassis in the usual manner by a compensating link 13. At its other end, my improved shock absorbing device A is interposed between the spring and the chassis.

The shock absorbing device proper, as shown, preferably consists of a cylindrical shell or casing 14, two wedge members 15—15 and two friction shoes 16—16. The shell 14 is provided at the top thereof with suitable flanges 17, by which it is riveted or otherwise rigidly secured to the chassis. Said shell is open at the bottom, as clearly indicated in Fig. 2, and at the top is provided with an opening 18 of reduced diameter to permit the extension of the wedges 15 therethrough.

Each wedge member 15 is provided with a pair of inclined friction wedge faces 19—19 and a depending side arm 20, the latter having an inclined cylindrical boss 21, as shown in Fig. 4. At the top, the wedge 15 is provided with a semi-cylindrical extension 22 that passes up through the opening 18 above mentioned. From this construction, it is evident that the wedges 15 are formed with shoulders 23 which engage the upper wall of the shell 14 and thereby limit the upward movement of the wedges. The extensions 22 of the wedges 15 are enclosed by a wear or striking cap 24 preferably convex on its upper side, as indicated at 25. Said cap is held in place by any suitable means—such as the pin 26.

Each of the friction shoes 16 is provided at its upper end with a wedge face 27 adapted to co-operate with the corresponding adjacent wedge faces 19 of the wedge members 15 and at its lower end each shoe 16 is provided with another wedge face 28. The shoes 16 are formed with cylindrical surfaces 29 adapted to frictionally co-operate with the interior friction surfaces of the shell 14, as will be evident from an inspection of Fig. 3.

The upper plate 30 of the semi-elliptic spring is provided at its end adjacent the shock absorbing device with a circular loop, as indicated at 31 in Fig. 2. This loop 31 is made with an interior diameter somewhat greater than the diameter of the cylindrical lugs 21 so that the latter will fit loosely within the loop. In this manner, the loop 31 will engage the wedge faces 28 of the shoes 16 in a spreading or wedging manner so as to constantly force the shoes outwardly into tight frictional engagement with the shell 14. At the same time, it will be evident that the spring cannot be detached from the shock absorbing device because of the insertion of the cylindrical lugs 21 within the loop 31.

To actuate the shock absorbing device A, I employ the following means: Secured to the chassis 10 is a plate 32 having a pivotal lug 33 thereon, on which is pivotally mounted a lever 34 of the first class. One end of said lever 34 is normally positioned a slight distance above the striking cap 24, is indicated at 35 in Fig. 1. The other end of the lever 34 is forked and has pivotally attached thereto the upper end of a link 36. The lower end of the link 36 is pivotally attached to the plate 37 employed in connection with the bolts 38 to clamp the spring 11 on the axle 12.

The operation is as follows: Upon relative approach of the axle and chassis, the spring 11 will absorb all usual shocks in the regular manner. Any excessive shock will cause the end 35 of the lever 34 to engage the cap 24 and thus press the wedges and friction shoes downwardly against the resistance of the spring 11. The amount of relative movement between the axle and chassis 10 permitted before the friction device is brought into play can be varied as desired. As the friction device A is operated, it is evident that the shoes 16 will be spread or wedged apart tight against the shell 14, thus generating friction and serving to dampen further relative approach of the chassis and axle. As heretofore explained, the coil 31 of the spring will itself serve as an effective spreader for the lower ends of the shoes, and, after the shock has been absorbed, the parts will be returned to normal position by the return of the spring 11 to its normal or neutral condition.

The parts may be easily made in the form of castings, readily assembled, and applied to automobiles now in use by merely eliminating one of the usual compensating links and substituting therefor the improved friction device A and applying the lever and link means for operating the friction device.

I claim:

1. In a device of the character described, the combination with a vehicle body member, axle and spring interposed therebetween; of an auxiliary shock absorbing device including, a shell attached to the body member, a wedge, and friction shoes within the shell, said spring having one end thereof united to one of said elements; and independent means interposed between the axle and said device for actuating the latter after a predetermined relative approach of the axle and body member.

2. In a device of the character described, the combination with a chassis, axle, a semi-elliptic spring, one end of said spring being attached to the chassis by a link, of a shell secured to the chassis, a wedge extending outside of the shell, friction shoes within said shell and co-operating with said wedge, means for attaching the other end of said spring to said wedge and means interposed between the axle and the extended portion of the wedge for actuating the latter after a predetermined movement of the axle and chassis toward each other.

3. In a device of the character described, the combination with a chassis, axle, a semi-elliptic spring, one end of said spring being attached to the chassis by a link, of a shell secured to the chassis, a wedge extending outside of the shell, friction shoes within said shell and co-operating with said wedge, means for attaching the other end of said spring to said wedge, and means interposed between the axle and the extended portion of the wedge for actuating the latter after a predetermined movement of the axle and chassis toward each other, said means including a lever pivoted to the chassis and a link pivotally interposed between said lever and the axle.

In witness that I claim the foregoing I have hereunto subscribed my name this 15th day of May 1919.

JOHN F. O'CONNOR.